US006456704B1

United States Patent
Buck

(10) Patent No.: US 6,456,704 B1
(45) Date of Patent: Sep. 24, 2002

(54) METHOD AND SYSTEM FOR PROGRAMMING A DIGITAL SENDER VIA CALLER ID

(75) Inventor: Dean C Buck, Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/417,583

(22) Filed: Oct. 14, 1999

(51) Int. Cl.$^7$ .............................................. H04M 11/00
(52) U.S. Cl. ............................ 379/100.14; 379/142.15; 379/355.03
(58) Field of Search ...................... 379/100.14, 142.01, 379/142.04, 142.13, 142.15, 355.02, 355.03, 354

(56) References Cited

U.S. PATENT DOCUMENTS 5,930,350 A * 7/1999 Johnson ...................... 379/355
6,067,349 A * 5/2000 Suder et al. ................. 379/142
6,320,943 B1 * 11/2001 Borland ................. 379/142.01

* cited by examiner

Primary Examiner—Stella Woo

(57) ABSTRACT

A system and method for capturing and communicating caller information for a digital communication device are disclosed. In a preferred embodiment, a caller ID device captures caller information from inbound and/or outbound calls. Thereafter, the caller ID device can communicate captured caller information to a digital communication device, such as a digital sender or fax machine, wherein the digital communication device can then communicate data to a destination indicated by the caller information. In a preferred embodiment, the caller ID device can also communicate control signals to the digital communication device to control how the device responds upon receiving caller information from the caller ID device. For example, in a preferred embodiment, the caller ID device can communicate a control signal to the digital communication device that activates the device to communicate data to a destination indicated by the communicated caller information. As another example, in a preferred embodiment, the caller ID device can communicate a control signal to the digital communication device that causes the device to program the caller information into the digital communication device's memory for future use. Thus, in a preferred embodiment, a user may select caller information that has been captured by the caller ID device to be communicated to the digital communication device, and the user may easily cause such caller information to be programmed in the digital communication device and/or activate the digital communication device to send data to the destination indicated by such caller information.

20 Claims, 1 Drawing Sheet

METHOD AND SYSTEM FOR PROGRAMMING A DIGITAL SENDER VIA CALLER ID

BACKGROUND

Digital Senders, such as the HP 9100C Digital Sender, are available in the prior art. Typically, digital senders are "appliance devices" that are self-contained (i.e., they do not require a PC in order to operate). Generally, digital senders allow users to integrate paper documents into the electronic workplace, providing a reliable and cost-effective alternative to typical paper distribution systems, such as facsimile (fax), mail, and courier. A digital sender typically allows a user the ability to send information or data contained on a paper document to a destination electronically. Thus, a digital sender typically is capable of converting paper documents into digital form and communicating the digital document to a destination. For example, a digital sender may allow a user to send a digital version of a paper document to a destination e-mail address or destination fax number. As a further example, the HP 9100C allows a user to send a digital document to an e-mail address, network fax, HP JetSend-enabled device, network printer or personal computer.

Typically, prior art digital senders include a typewriter-like keyboard that allows users to manually enter destination information at the device. Similar to sending e-mail from a PC, a digital sender may enable users to type e-mail addresses or to cue personalized e-mail addresses or distribution lists from a customized address book stored in the digital sender's memory, thus allowing users to send paper-based documents as e-mail messages. Furthermore, a digital sender may enable users to type a destination fax number or to cue a destination fax number from a customized address book stored in the digital sender's memory, thus allowing users to send paper-based documents as a fax.

Referring to FIG. 1, an exemplary digital sender 100 of the prior art is shown. As shown, the digital sender 100 has a display 102 for displaying information to a user. Additionally, the digital sender 100 has a keyboard 104 that allows a user to manually enter information, such as destination information. Typically, as a user enters destination information using keyboard 104 the destination information is displayed on display 102 to allow the user to ensure that he/she has entered the destination information correctly. That is, display 102 allows the user to view the destination information as the user types such destination information into the digital sender. Once the desired destination information is entered into the digital sender, the digital sender allows a user to send a digital version of paper document(s) 106 to the destination.

Prior art digital senders typically allow users the ability to program commonly used destination information (e.g., commonly used destination fax numbers or commonly used destination e-mail addresses), also referred to herein as a destination code, into the digital sender's memory for future use. By having destination codes programmed into the digital sender, a user can access a programmed destination code on the digital sender and cause the digital sender to direct communication to such programmed destination code without requiring the user to manually key the destination code. For example, the user may look up a desired destination code from the destination codes programmed in the digital sender, and then press a single key to "speed dial" the desired destination code.

Typically, a destination code is programmed into the digital sender by a user pressing a key (or sequence of keys) on the digital sender to enter a "programming mode." Thereafter, the user can manually key in the destination code using the digital sender's keyboard. Once the user has completed the process of entering the destination code, the user can press a key (or sequence of keys) to cause the digital sender to exit the programming mode. If the entered destination code later changes or otherwise needs to be updated by a user, the user follows a similar procedure to update an existing destination code stored in the digital sender's memory. Thus, prior art digital senders provide users the ability to manually program commonly used destination codes into the digital sender.

Several problems exist with prior art digital senders. First, with prior art digital senders, a user is required to know a destination code in order to enter or program such code into the digital sender. For example, if a user desires to enter or program a particular destination e-mail address or destination fax number into the digital sender, the user must first determine the proper destination e-mail address or fax number to be keyed into the digital sender. Accordingly, a user must either have the destination code memorized or the user must refer to some type of destination code book, such as a telephone directory or other listing for the destination code, before the user can enter or program the destination code into the digital sender.

Additionally, the process required for programming a destination code into prior art digital senders is not user friendly. Prior art digital senders typically require a user to press a sequence of keys on the digital sender to enter the programming mode, and once the digital sender is in programming mode, a user must follow a particular sequence of instructions to program a desired destination code into the digital sender. As shown in FIG. 1, prior art digital senders typically have a typewriter-like keyboard, as well as various other buttons for interacting with the digital sender. Thus, to a novice user, programming a destination code into the digital sender can be an intimidating task. Because prior art digital senders are not user friendly to program, users may spend relatively long periods of time attempting to program a destination code into a digital sender or learning how to perform such task. Thus, programming prior art digital senders can be inefficient for users. Alternatively, some users may simply not take advantage of the programming feature of prior art digital senders. That is, the task of programming prior art digital senders may be so intimidating to a user that the user decides not to program commonly used destination codes into the digital sender. As a result, the user must manually enter a destination code each time that the user desires to communicate a digital document to that destination, which also results in inefficiency for the user.

A further problem with prior art digital senders is that a mechanism is required for such digital senders to allow a user to manually program destination information into the digital senders. For example, a keyboard, such as keyboard 104, is required for manual programming of destination information into the digital sender. As another example, a display, such as display 102, is required to provide feedback information to a user, e.g., to indicate whether the user has entered the destination information correctly. Such mechanisms required for manually programming prior art digital senders increase the size, complexity, and cost of the digital senders. It should be recognized, that some or all of the above problems are not limited only to prior art digital senders, but also apply to other digital communication devices that communicate information to a destination, such as prior art fax machines.

SUMMARY OF THE INVENTION

In view of the above, there exists a desire for a system and method for providing caller information (i.e., a fax number, telephone number, e-mail address, or other destination information) to a digital communication device. Many digital communication devices exist, such as digital senders and fax machines, which communicate data to a destination. A desire exists for a system and method for providing caller information to such digital communication devices in order that the digital communication devices can communicate data to a destination indicated by the provided caller information.

A further desire exists for a system and method for providing caller information to a digital communication device, wherein a user is not required to know the caller information. Accordingly, a desire exists for a system and method that do not require a user to memorize caller information or look up the caller information in a directory, such as a telephone directory. Still a further desire exists for a system and method for providing caller information to a digital communication device, wherein a user is not required to manually enter and/or manually program the caller information into the digital communication device. Thus, a desire exists for a system and method that are user friendly and allow a user to easily enter and/or program caller information into the digital communication device.

These and other objects, features and technical advantages are achieved by a system and method which utilizes caller ID technology to automatically capture caller information and communicate such information to a digital communication device. Caller information, such as a telephone number, fax number, and/or name, is available digitally through well-known automatic number identification (ANI) techniques (i.e., caller ID). A preferred embodiment of the present invention utilizes a caller ID device to automatically capture caller information. Thereafter, the caller ID device can communicate such caller information to a digital communication device. Such digital communication device is capable of communicating digital information to a destination indicated by the caller information, in a preferred embodiment. In a most preferred embodiment, the digital communication device is a digital sender. Although, in other embodiments the digital communication device may be any type of digital communication device, such as a fax machine or a personal computer (PC). In a most preferred embodiment, the digital communication device is an "appliance device." An "appliance device" is a device that is capable of operating to perform a particular task(s) without requiring a PC for such operation. Examples of typical "appliance devices" include digital senders and fax machines. However, in other embodiments the digital communication device may be a device that operates in conjunction with a PC or may actually be a PC.

In a preferred embodiment, the caller information communicated from the caller ID device to the digital communication device can be automatically programmed into the digital communication device's memory, whereby a user is not burdened with the task of manually programming such caller information into the digital sender. For example, the caller ID device may have an input mechanism (e.g., a button) that allows a user to command the caller ID device to communicate selected caller information to the digital sender to be automatically programmed into the digital sender's memory. Additionally, in a preferred embodiment, the caller ID device can activate the digital communication device to communicate data to a destination indicated by the communicated caller information. In a preferred embodiment, the caller ID device may activate the digital communication device to communicate data to the destination indicated by the caller information without requiring that the communicated caller information be programmed into the digital communication device's memory. Thus, for example, the caller ID device may have an input mechanism (e.g., a button) that allows a user to command the caller ID device to communicate selected caller information to the digital sender and to activate the digital sender to communicate data to the destination indicated by the caller information, without necessarily programming the communicated caller information into the digital communication device's memory.

Thus, in a preferred embodiment, the caller ID device communicates control signals to the digital communication device to control how the digital communication device responds upon receiving the caller information from the caller ID device. For example, the caller ID device can communicate a control signal that instructs the digital communication device to communicate digital information to a destination indicated by the received caller information. As another example, the caller ID device can communicate a control signal that instructs the digital communication device to program the received caller information into the digital communication device's memory.

In a preferred embodiment, the caller ID device is capable of capturing caller information from a received inbound call. Additionally, in a preferred embodiment, the caller ID device is capable of capturing caller information from a placed outbound call. In a preferred embodiment, the caller ID device is an external device that is coupled serially to the digital communication device and a communication network, such as a public or private switched telephony network. However, in alternative embodiments, the caller ID device can be integrated within the digital communication device.

It should be appreciated that a technical advantage of one aspect of the present invention is that a system and method for automatically capturing caller information and communicating such caller information to a digital communication device are provided. Accordingly, a user is not required to know caller information that has been captured. Additionally, a user is not required to manually enter such captured caller information into the digital communication device in order for the digital communication device to communicate data to a destination indicated by the caller information.

Further, a technical advantage of one aspect of the present invention is that control signals can be communicated from the caller ID device to the digital communication device to control how the digital communication device responds upon receiving the caller information from the caller ID device. Accordingly, the digital communication device may be automatically activated to communicate data to the destination indicated by the caller information received by the digital communication device from the caller ID device. Also, the digital communication device may automatically program the caller information received from the caller ID device into the digital communication device's memory for future use (e.g., for "speed dialing"). Thus, a user may not be required to manually enter destination information for communicating data from the digital communication device. Moreover, a user is not required to be burdened with manually programming the captured caller information into the digital communication device's memory.

Additionally, a technical advantage of one aspect of the present invention is that a digital communication device is not required to include input mechanisms for manually entering and/or programming caller information into the device. Thus, the keyboard, display, and other mechanisms typically required on a digital communication device to allow a user to manually enter and/or program information into the device may be reduced or eliminated. Although, in a preferred embodiment of the present invention, such mechanisms remain on the digital communication device to allow a user the option of manually entering and/or programming caller information into the device, such as caller information that has not been captured by the caller ID device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
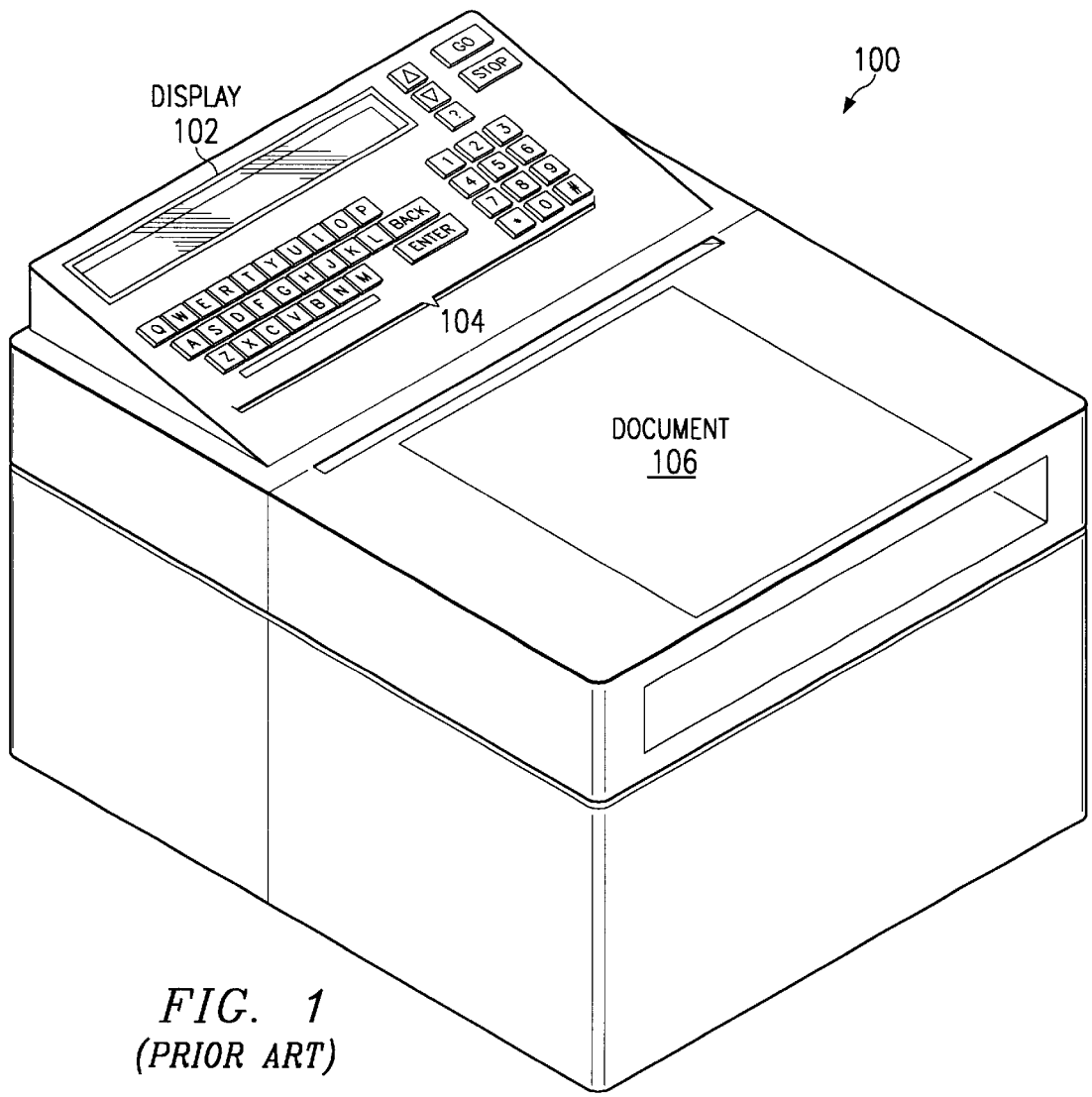
FIG. 1 shows a prior art digital sender.
Figure 2:
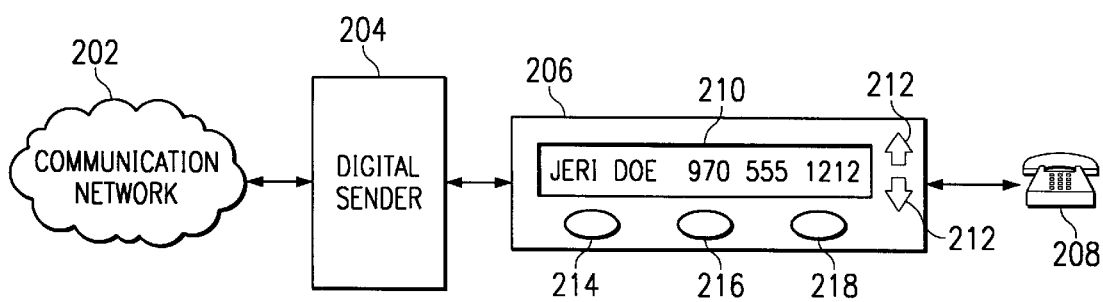
FIG. 2 shows a preferred embodiment of the present invention.

Referring now to FIG. 2, a preferred embodiment of the present invention is shown. Shown in FIG. 2 is communication network 202, over which information, such as digital documents, may be communicated from a digital sender 204 to a desired destination. It shall be understood that network 202 may comprise any means of information communication, such as a public switched network (PSN), a proprietary network, a general purpose processor-based information network, dedicated communication lines, a satellite system, a cable system, a computer network, direct device to device connection, a local area network (LAN), a wide area network (WAN), modem to modem connection, an Intranet, the Internet, or any combination thereof suitable for providing information communication between a particular destination and digital sender 204. In a most preferred embodiment, network 202 is a public or private switched telephony network.

As also shown in FIG. 2, digital sender 204, Caller ID device 206 and telephone 208 are coupled in series with the communication network 202. It should be understood that the digital sender 204, Caller ID device 206 and telephone 208 may be arranged serially in any order in a preferred embodiment, and are not intended to be limited solely to the arrangement shown in FIG. 2. Digital sender 204 may be substantially similar to digital senders of the prior art, or digital sender 204 may be modified to reduce its complexity, size, and/or cost. For example, digital sender 204 may have a reduced keyboard and/or a reduced display. Also, it should be understood that digital sender 204 may be modified over the prior art to have increased complexity, size and/or cost, and any such digital sender now known or later developed is intended to be within the scope of the present invention.

In a preferred embodiment, caller ID device 206 is a device that is capable of performing automatic number identification (ANI) to automatically capture information about a calling party, such as the party's telephone/fax number and name. As calls are received by digital sender 204 and telephone 208, the caller ID device 206 captures and stores information about the calling party. Caller ID device 206 comprises a display 210 to communicate information to a user. For example, a user can interact with arrows 212 to scroll up and down through the stored information captured by the caller ID device 206, wherein such information is displayed on display 210.

In a preferred embodiment, a user can interact with caller ID device 206 to automatically program caller information stored in caller ID device 206 into digital sender 204 for future use with the digital sender (e.g., for speed dialing). For example, in a preferred embodiment, a user can scroll through the caller information that has been captured and stored in caller ID device 206 to access the desired caller information, which can be displayed on display 210. Thereafter, the user can activate input mechanism 214 (e.g., a button), which causes caller ID device 206 to automatically program the displayed caller information into digital sender 204.

Additionally, in a preferred embodiment, a user can interact with caller ID device 206 to program caller information entered by a user on telephone 208 into digital sender 204 for future use with the digital sender (e.g., for speed dialing). For example, suppose a user has looked up a destination code (e.g., telephone number) for a particular party, and is about to place a telephone call to the number using telephone 208 or about to transmit a fax using a fax machine (not shown). Suppose further that the user would like to have the telephone/fax number echoed to the digital sender 204 and programmed into the digital sender's memory. In a preferred embodiment, a user can activate input mechanism 216 (e.g., a button), which notifies the caller ID device 206 to capture the telephone/fax number thereafter entered on telephone 208 or an associated fax machine and program such telephone/fax number into digital sender 204.

As discussed above, in a preferred embodiment, caller ID device 206 is capable of programming destination information (e.g., telephone/fax numbers) into the digital sender 204 by communicating information that has been captured and stored in caller ID device 206 from inbound calls or by communicating outbound call information to the digital sender 204. Additionally, in a preferred embodiment, a user can interact with caller ID device 206 to cause information to be communicated from digital sender 204 to a destination code stored in the caller ID device 206, without necessarily programming such destination code into the digital sender's memory. For example, suppose that a particular party's destination code (e.g., telephone/fax number) has been captured and stored in caller ID device 206. Further suppose that a user desires to send information (e.g., a digital version of a paper document) to the particular party, but does not desire to have the particular party's destination code programmed into the digital sender's memory for future use. That is, the user only wants to respond to the particular party. The user can utilize caller ID device 206 to access the particular party's destination code and activate input mechanism 218, which causes information (e.g., a digital version of paper documents contained on the digital sender's platen) to be sent to the particular party. Thus, a user can utilize a preferred embodiment of caller ID device 206 to initiate communication from digital sender 204 to a destination that has been captured and stored in caller ID device 206.

It should be understood that in a preferred embodiment, call ID device 206 may have the capability of capturing various types of destination information, including non-telephony types of destination information. For example, in a preferred embodiment caller ID device 206 may capture and store destination information including, but not limited to, telephone destination information (e.g., telephone number), fax destination information (e.g., fax number), e-mail destination information (e.g., e-mail address), LAN destination information (e.g., IP address), web destination information (e.g., Uniform Resource Locator), and pager destination information (e.g., pager number).

Thus, in a preferred embodiment, destination information for a telephone or fax may be captured by the caller ID device 206 and communicated to the digital sender 204, whereby the digital sender 204 can transmit a paper document electronically to the destination e-mail address or web site. Also, in a preferred embodiment, destination information for a node on a LAN, such as a PC, printer, storage device, or a personal information manager (e.g., a palm pilot), may be captured by the caller ID device 206 and communicated to the digital sender 204, whereby the digital sender 204 can transmit a paper document electronically to the destination LAN address. Additionally, in a preferred embodiment, destination information for a pager may be captured by the caller ID device 206 and communicated to digital sender 204, whereby the digital sender 204 can transmit a pager document electronically to the destination pager number.

In a preferred embodiment, caller ID device 206 has the capability of automatically capturing and storing destination information from inbound or outbound communication, such as telephone/fax number. Such automatic identification of destination information (which may herein also be referred to as "caller information") is well known in the art and therefore will not be discussed in great detail herein. For example, automatic number identification is commonly implemented within prior art caller ID boxes that allow users to screen incoming calls. It should be understood that any techniques now known or later developed for capturing and storing destination information may be implemented within caller ID device 206, and any such implementation is intended to be within the scope of the present invention.

Additionally, in a preferred embodiment, caller ID device 206 has the capability to communicate control information to the digital sender 204 and receive control information from the digital sender 204. That is, in a preferred embodiment, the caller ID device 206 can communicate control signals to the digital sender 204 to control how the digital sender 204 responds upon receiving caller information (i.e., "destination" information) from the caller ID device 206. For example, the caller ID device 206 may communicate a control signal that instructs the digital sender 204 to communicate digital data to a destination indicated by the received caller information. As another example, the caller ID device 206 may communicate a control signal that instructs the digital sender 204 to program the received caller information into the digital communication device's memory for future use.

Additionally, in a preferred embodiment, a control signal (or a "meta signal") can be sent from the caller ID device 206 to the digital sender 204 to notify the digital sender 204 that the caller ID device 206 has information to be communicated to the digital sender 204. Accordingly, such control signals operate to notify the digital sender 204 that communicated information is from the caller ID device 206 and is intended for the digital sender 204, as opposed to the communicated information being intended for some other communication device. For instance, a printer (not shown in FIG. 2) may be coupled in series with the digital sender 204 to the communication network 202, and such printer may receive information from the communication network 202 and print the received information. Suppose that a distributed family desires to communicate photographs to one another. Further suppose that Member A lives in Dallas and Member B lives in Denver, and both Member A and Member B have a local digital sender and a local printer. Furthermore, suppose that each local digital sender 204 and local printer (not shown) is connected in series with one another. Member A can utilize Member A's local digital sender 204 in Dallas, to send a photograph digitally via the communication network 202, which can be received and printed on Member B's printer (not shown) in Denver. Thus, in the preferred embodiment, control signals are communicated to allow the digital sender 204 in Denver to distinguish between data that is being received from the caller ID device 206 in Denver intended for the digital sender 204 in Denver, and data that is being received from the communication network 202, that is intended for the printer (not shown) in Denver.

Moreover, in a preferred embodiment, some type of handshaking may be performed between the caller ID device 206 and the digital sender 204 before caller information and/or instructions are communicated to the digital sender 204. In general, two types of timing need to be coordinated between the caller ID device 206 and the digital sender 204. One is the byte information to be communicated between the devices. In a preferred embodiment, the byte information is coordinated on a timing basis, wherein each byte appears in a time window, in a manner similar to that typically performed in modem and serial I/O communication. It should be understood that in alternative embodiments any method now known or later developed for coordinating the byte information may be utilized, and any such embodiment is intended to be within the scope of the present invention.

The other timing required to be coordinated is the state of the digital sender 204, e.g., busy or ready to receive, and various methods may be utilized for this coordination. For example, the caller ID device 206 may send a control signal to the digital sender 204 notifying the digital sender 204 that it has information to be communicated to the digital sender 204. Thereafter, when the digital sender 204 is ready to receive the information from the caller ID device 206, the digital sender 204 may respond with a control signal that indicates that it is ready to receive the information. After such a successful handshake is performed, the caller ID device 206 may actually communicate the information and/or instructions to the digital sender. Thus, if the digital sender 204 is busy (e.g., receiving or sending data) when a user requests that the caller ID device 206 communicate caller information to the digital sender 204, handshaking may be performed between the caller ID device 206 and the digital sender 204 to ensure that the digital sender is ready to receive information from the caller ID device 206 before the caller ID device 206 communicates such information to the digital sender 204. However, it should be understood that an alternative embodiment may be implemented such that communication can be performed in parallel. That is, the digital sender 204 could be sending information (e.g., a picture) on communication network 202 while it is receiving information (e.g., commands and data) from caller ID device 206.

As shown and described in conjunction with FIG. 2, the caller ID device 206 can be an external device coupled to the digital sender 204. However, it should be understood that in alternative embodiments, all or part of the caller ID device may be integrated within the digital sender. In such alternative embodiments, the display and input mechanisms shown for caller ID device 206 may be implemented within the digital sender's control panel.

It should be understood that a preferred embodiment allows for the digital sender's control panel, e.g., the keyboard, display, and other mechanisms to be reduced. That is, the digital senders control panel may be reduced because a user is not required to manually enter and/or program information into the digital sender. Although, in a most preferred embodiment, the digital sender retains a sufficient control panel to allow a user the ability to manually enter and/or program information into the digital sender if so desired. For example, a user may want to manually program caller information that has not been captured by the caller ID device (e.g., information for a caller that has not called the user) into the digital sender. Moreover, in a most preferred embodiment, the caller ID device is implemented such that it is capable of operating with digital senders and/or other digital communication devices existing in the prior art. Thus, for example, a user may obtain a caller ID device of a most preferred embodiment, and utilize the caller ID device for easy and convenient operation of the user's existing digital sender.

Although the present invention has been described herein in conjunction with a digital sender, it shall be understood that many other types of digital communication devices, such as fax machines, may be implemented instead of or in addition to a digital sender within a preferred embodiment, and any such implementation is intended to be within the scope of the present invention. Thus, the present invention is not intended to be limited only to the description of operation in conjunction with a digital sender as provided herein, rather such description in accordance with a digital sender is intended as an example that renders the disclosure enabling for many other digital communication devices that communicate electronically across telephone lines.

It should be understood that software, hardware, firmware or any combination thereof may be implemented within the caller ID device to capture caller information, communicate control signals to the digital sender, and/or communicate the caller information to the digital sender, and any such implementation is intended to be within the scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of providing caller information for a digital communication device, the method comprising:

automatically capturing caller information at a caller ID device;

communicating said caller information from said caller ID device to a digital communication device, wherein said digital communication device is capable of communicating digital information to a destination indicated by said caller information; and communicating a control signal from said caller ID device to said digital communication device to control how said digital communication device utilizes said caller information.

2. The method of claim 1, wherein said control signal activates said digital communication device to communicate said digital information to said destination indicated by said caller information.

3. The method of claim 1, wherein said digital communication device comprises memory for storing caller information, and wherein said control signal causes said digital communication device to program said caller information into said digital communication device's memory.

4. The method of claim 1, wherein said capturing caller information further comprises:

capturing caller information from an inbound call.

5. The method of claim 1, wherein said capturing caller information further comprises:

capturing caller information from an outbound call.

6. The method of claim 1, wherein said digital communication device is a digital sender.

7. The method of claim 1, wherein said digital communication device is a fax machine.

8. The method of claim 1, wherein said caller ID device is integrated within said digital communication device.

9. The method of claim 1, wherein said caller information is information selected from the group consisting of a telephone number, a fax number, an e-mail address, a LAN address, a web address, a pager number, a name, and any combination thereof.

10. The method of claim 1 further comprising:

receiving, as user input to said digital communication device, information that said digital communication device is operable to communicate as said digital information.

11. A system for digital communication, the system comprising:

a communication device operable to communicate digital information therefrom over a communication network; and a caller ID device operable to automatically capture caller information, said caller ID device and said communication device coupled in series with said communication network, wherein said caller ID device is operable to communicate said caller information to said communication device and wherein said caller ID device is operable to communicate a control signal to said communication device for controlling how said communication device utilizes said caller information.

12. The system of claim 11, wherein said control signal comprises a signal that activates said communication device to communicate said digital information to said destination indicated by said caller information.

13. The system of claim 11, wherein said communication device comprises memory for storing caller information, and wherein said control signal causes said communication device to program said caller information into said communication device's memory.

14. The system of claim 11, wherein said communication device is a digital sender.

15. The system of claim 11, wherein said caller ID device is external to said communication device.

16. The system of claim 11 wherein said communication device is operable to receive user input identifying a destination for communicating digital information therefrom over said communication network.

17. An apparatus for providing caller information to a digital communication device operable to communicate user input information over a communication network as digital information, wherein said apparatus is communicatively coupled in series with said digital communication device and said communication network, the apparatus comprising:

- a caller ID means for automatically capturing caller information;
- a means for communicating said caller information to said digital communication device; and
- a means for communicating a control signal to said digital communication device to control how said digital communication device responds upon receiving said caller information from said caller ID means.

18. The apparatus of claim 17, wherein said control signal is a signal that activates said digital communication device to communicate digital information to a destination indicated by said caller information.

19. The apparatus of claim 17, wherein said control signal is a signal that causes said digital communication device to program said caller information into said digital communication device's memory.

20. The apparatus of claim 17, wherein said caller ID means, said means for communicating said caller information, and said means for communicating a control signal are integrated within said digital communication device.

* * * * *